UNITED STATES PATENT OFFICE.

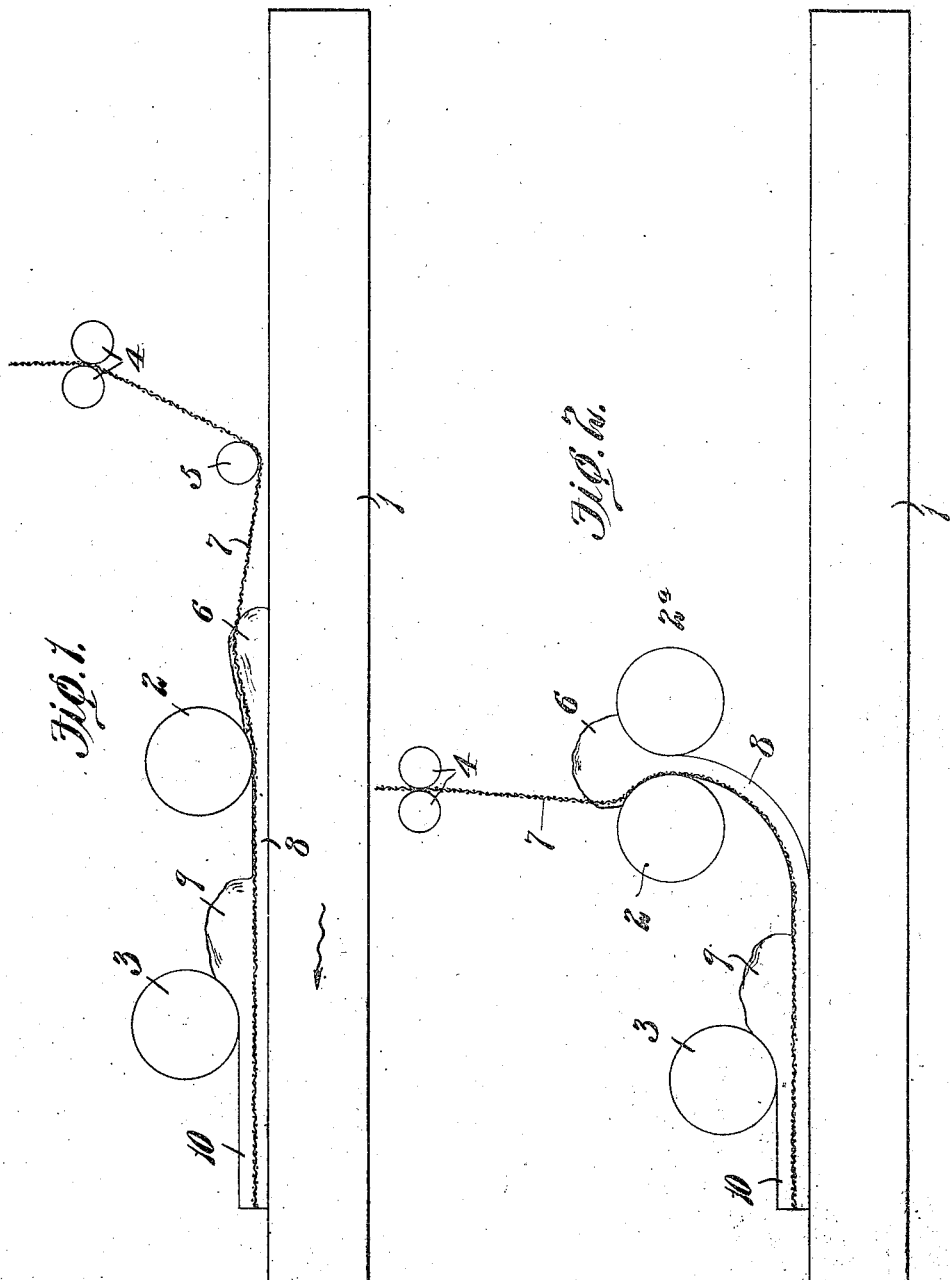

ROBERT A. B. WALSH, OF ST. LOUIS, MISSOURI, ASSIGNOR TO MISSISSIPPI GLASS COMPANY, OF ST. LOUIS, MISSOURI, A CORPORATION OF MISSOURI.

METHOD OF AND MACHINE FOR MAKING WIRE-GLASS.

940,839.  Specification of Letters Patent.  Patented Nov. 23, 1909.

Original application filed May 22, 1907, Serial No. 375,112. Divided and this application filed December 2, 1907. Serial No. 404,847.

*To all whom it may concern:*

Be it known that I, ROBERT A. B. WALSH, citizen of the United States, residing at St. Louis, Missouri, have invented a certain new and useful Improvement in Methods of and Machines for Making Wire-Glass, of which the following is a full, clear, and exact description, such as will enable others skilled in the art to which it appertains to make and use the same, reference being had to the accompanying drawings, forming part of this specification, in which—

Figures 1 and 2 are side elevations of different forms of apparatus which may be used in practicing my invention.

This invention relates to a new and useful method of, and a machine for making wire glass, and particularly wire glass in which a plurality of layers are employed to form the ultimate sheet.

The object of my invention is to produce a sheet of wire glass having smooth brilliant surfaces, the wire of said sheet retaining its original bright and new appearance after it has been embedded in the glass.

In the manufacture of wire glass the tendency of the wire is to contract and "draw" the glass so as to produce an uneven or an irregular surface. It has been proposed, see for illustration the patent to Walsh, No. 610,593, dated September 13, 1898, to cure these irregularities by smoothing them down by a finishing roller; but this cannot always be successfully accomplished, because, while the finishing roller acts upon the elevations, it will not perfectly transfer the surplus glass to the depressions and make a perfect weld. It has also been proposed, see for illustration the Schmertz reissue patent No. 12,443, dated January 30, 1906, to press the wire mesh into the top surface of a first formed sheet or layer of glass and then spread a finishing layer or sheet of molten glass thereover. This method produces a better and smoother finish to the top surface of the sheet than the Walsh method first-mentioned. In both of these methods, the wire, on account of its exposure to atmosphere after being heated, loses its bright and new appearance and looks black in the finished sheet. In the Schmertz method the weld between the two layers occurs principally in the plane of the wire, and as the wire is at places left free to "draw" this action is sometimes observed on the surface of the second layer.

Briefly stated, my method consists in forming a sheet of glass by first rolling a bottom layer or sheet and drawing a wire mesh into said sheet so that it is completely covered and thereafter spreading a mass of molten glass over the upper surface of said bottom layer or sheet to form a finishing coating therefor. The wire mesh is drawn into the glass or caused to cut its way into the glass by means of tension rolls at the same time the bottom layer or sheet is being formed so that in its heated condition the wire mesh will not be exposed to atmosphere and will accordingly preserve its bright and new appearance in the glass.

It is obvious that my invention is not limited to a single type of machine but may be embodied in different forms of apparatus. I have shown two of these forms in the accompanying drawings and will first refer to that shown in Fig. 1 which comprises a table 1 having a smooth surface roller 2 arranged above the upper surface thereof and adapted to coöperate with the table to form a mass of molten glass into a bottom layer or sheet, and a smooth surface roller 3 arranged above the table at a distance equal to the thickness of the finished product and adapted to spread a mass of molten glass over the upper surface of the bottom layer to form a finishing coating therefor.

The means for causing the wire mesh to cut its way into the mass of molten glass consists of a pair of tension rolls 4 between which the wire mesh passes and a guide roll 5 located in front of the roller 2.

In practicing my invention with apparatus of this description, a mass of molten glass 6 is dumped onto the table at the rear side of the roller 2 and a wire mesh 7 is interposed between this mass of molten glass and the roller 2, the wire mesh passing from the tension rolls under the guide roll 5, as shown in Fig. 1. The wire mesh is drawn taut and the table 1 is then moved in the direction of the arrow in Fig. 1, thus causing the roller 2 to form the mass of molten glass 6 into a bottom layer 8, into the upper surface of which the wire mesh 7 cuts its way and completely embeds itself. When the front end of the bottom layer 8 reaches the roller 3 a second mass of molten glass 9 is dumped onto the bottom layer at the rear of the roller 3 and as the table continues to move forwardly in the direction of the arrow in Fig. 1 the roller 3 will spread this mass of molten glass 9 over the upper surface of the bottom layer 8 to form a finishing coating or layer 10 of molten glass which fills in the spaces in the upper face of the bottom layer which were produced by drawing the wire into said layer. As the wire mesh is drawn into the bottom layer at the same time said layer is formed the wire mesh will be completely covered by glass and thus be prevented from oxidizing as would be apt to occur if it was exposed to the air while in its heated condition from contact with the molten glass.

The tendency of the wire to "draw" the glass in contracting and produce an irregular or uneven surface on the first formed layer or sheet is corrected by the finishing layer which not only fills in the unevenness in the first formed sheet or layer but said finishing layer more readily partakes of and retains the smooth and even surface imparted by the smooth surface roller 3.

Instead of forming the bottom layer 8 by means of the table and the smooth surface roller 2, said bottom layer may be formed by means of a pair of rollers 2 and 2ª as in the apparatus shown in Fig. 2, the wire mesh passing through a pair of tension rolls 4 which are so located relatively to the roller 2 that the wire mesh will cut its way into the mass of molten glass 6 and thus be completely embedded.

This application is a division of an application filed by me May 22, 1907, serially numbered 375,112.

Having thus described my invention, what I claim as new and desire to secure by Letters Patent is:

1. An apparatus for forming wire glass, comprising means for forming a sheet or layer of glass, means for drawing a wire mesh into said layer or sheet so that it is completely covered, and means for spreading a finishing coating or layer of glass over the first-formed sheet; substantially as described.

2. An apparatus for making wire glass, comprising means for forming a sheet or layer of glass, tension devices for drawing a wire mesh into one surface of said sheet, and means for spreading a mass of molten glass over said surface to form a finishing coating for the sheet or layer; substantially as described.

3. An apparatus for making wire glass, comprising means for rolling a sheet or layer of glass, tension devices for causing a wire mesh to cut its way into said sheet so that it is completely embedded at the same time said sheet is being formed, and means for spreading a mass of molten glass over the surface of said sheet into which the wire mesh is drawn to form a finishing coating for said sheet; substantially as described.

4. An apparatus for making wire glass, comprising means for forming a layer or sheet of glass, tension devices for drawing the wire mesh into the upper surface of said sheet so that it is completely covered, and means for spreading a mass of molten glass over the upper surface of said sheet to form a finishing coating therefor; substantially as described.

5. The method of making wire glass, which consists in forming a mass of molten glass into a layer and drawing a wire mesh beneath one surface thereof so that it is completely covered, and thereafter covering that surface of the layer with a mass of molten glass to produce a finished sheet; substantially as described.

6. The method of making wire glass, which consists in rolling a mass of molten glass into a layer or sheet and simultaneously drawing the wire mesh into one surface of said sheet so that it is completely covered, and thereafter spreading a mass of molten glass over the upper surface of said sheet to form a finishing layer therefor; substantially as described.

7. The method of making wire glass, which consists in rolling a mass of molten glass into a layer or sheet and drawing a wire mesh into the upper surface of said sheet so that it is completely covered, and thereafter spreading a mass of molten glass over the upper surface of said sheet and rolling it to produce a finishing coating for the sheet in which the wire mesh is embedded; substantially as described.

8. The method of making wire glass which consists in rolling a mass of molten glass into a layer and drawing a wire mesh beneath one surface thereof so that it is completely covered, and thereafter covering that surface of the layer with a mass of molten glass and rolling the same to produce a finished sheet before the first mentioned sheet is entirely formed.

In testimony whereof I hereunto affix my signature in the presence of two witnesses, this twenty sixth day of November 1907.

ROBERT A. B. WALSH.

Witnesses:
F. R. CORNWALL,
GEORGE BAKEWELL.